United States Patent
Shirane et al.

(10) Patent No.: US 7,153,606 B2
(45) Date of Patent: Dec. 26, 2006

(54) SECONDARY BATTERY (75) Inventors: Takayuki Shirane, Moriguchi (JP); Tetsu Hashimoto, Hirakata (JP); Naoto Arai, Ikoma (JP); Futoshi Tanigawa, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/826,389

(22) Filed: Apr. 19, 2004

(65) Prior Publication Data

US 2004/0247999 A1 Dec. 9, 2004

Related U.S. Application Data (63) Continuation of application No. PCT/JP02/09526, filed on Sep. 17, 2002.

(30) Foreign Application Priority Data

Oct. 19, 2001 (JP) .............................. 2001-321673
Dec. 3, 2001 (JP) .............................. 2001-368291

(51) Int. Cl.
*H01M 2/02* (2006.01)
*H01M 2/26* (2006.01)
(52) U.S. Cl. ....................... 429/164; 429/166; 429/168
(58) Field of Classification Search ................ 429/128, 429/164, 166, 168
See application file for complete search history.

(56) References Cited

U.S. PATENT DOCUMENTS 3,898,104 A * 8/1975 da Costa .................... 429/166
4,332,867 A * 6/1982 Tsuda et al. ................. 429/94

FOREIGN PATENT DOCUMENTS

| JP | 57-69721 | | 4/1982 |
|---|---|---|---|
| JP | 4-162351 | | 6/1992 |
| JP | 9-63630 | A | 3/1997 |
| JP | 09306442 | A * | 11/1997 |
| JP | 09312161 | A * | 12/1997 |
| JP | 10-284047 | | 10/1998 |
| JP | 11-204130 | A | 7/1999 |
| JP | 2000-48802 | A | 2/2000 |
| JP | 2000-243433 | A | 9/2000 |
| JP | 2000-294222 | | 10/2000 |
| JP | 3083554 | U | 11/2001 |
| JP | 2002-134160 | A | 5/2002 |
| JP | 2002170547 | A * | 6/2002 |

* cited by examiner

*Primary Examiner*—Gregg Cantelmo
(74) *Attorney, Agent, or Firm*—McDermott Will & Emery LLP (57) ABSTRACT A secondary battery including an electrode group formed by winding a positive electrode and a negative electrode with the interposition of a separator, the positive electrode includes a belt-shaped positive electrode core and a positive electrode material mixture carried on the positive electrode core, the negative electrode includes a belt-shaped negative electrode core and a negative electrode material mixture carried on the negative electrode core, at least one of the positive electrode and the negative electrode has an end portion parallel to the lengthwise direction thereof exposing the core, the end portion positioned at an end face of the electrode group is directly connected to a current collector plate, and at least part of the current collector plate is exposed outside at the bottom of a battery case.

5 Claims, 4 Drawing Sheets

SECONDARY BATTERY

This application is a continuation of PCT/JP/02/90526, filed on Sep. 17, 2002.

TECHNICAL FIELD

The present invention relates to a secondary battery improved in current collecting structure.

BACKGROUND ART

In recent years, electronic devices such as AV equipment and personal computers are becoming portable and wireless at a rapid pace. As a power source for them, there is a growing demand for a compact and lightweight secondary battery having high energy density. In particular, a lithium ion secondary battery using lithium as an active material is greatly expected as a battery showing high voltage and high energy density. Further, a secondary battery for power tools is required to be high-powered.

To meet the above-mentioned demands, it is important to reduce an internal resistance of a battery.

In a common secondary battery, electric current is collected from a positive electrode and a negative electrode via leads, respectively. Regarding a high-powered lithium ion secondary battery, on the other hand, there has been proposed a method of collecting the electric current by protruding an electrode core of either of the electrodes from an end of an electrode group and connecting the tip of the protrusion to a current collector plate (Japanese Laid-Open Patent Publication No. 2000-294222). In this case, the current collector plate is provided with a connector piece for connecting itself to the bottom of a battery case. According to this current collecting method, the resistance can be reduced as compared with use of the leads.

In general, welding of the lead or the connector piece to the battery case is carried out by making use of a hollow part defined as a winding core of the electrode group. For example, there has been a method of spot-welding them by using a welding rod or irradiating a laser beam or an electron beam.

If there is a hollow in the winding core of the electrode group as in a cylindrical battery, it is easy to weld the current collector plate and the bottom of the battery case. However, if there is no hollow in the winding core of the electrode group as in a prismatic battery, the above-mentioned current collecting method cannot be adopted. Further, as long as the method of resistance-welding the current collector plate and the bottom of the battery case by inserting the welding rod into the winding core is adopted, improvement in capacity based on the reduction of the hollow in the winding core is not expected. Moreover, entanglement of the separator occurs when the welding rod is inserted, which may cause failure.

On the other hand, there has also been proposed a spot-welding method by irradiating a laser beam or an electron beam from outside the battery case (Japanese Patent Publication No. 2937456). However, in the case of performing laser welding from outside the battery case because a gap is prone to be formed between the current collector plate and the battery case, the welding strength is apt to vary. To eliminate the gap, pressure needs to be applied from above to the electrode group. However, this may cause failure such as buckling of the electrode plates.

DISCLOSURE OF INVENTION

The present invention relates to a secondary battery comprising an electrode group, an electrolyte, a battery case for accommodating therein the electrode group and the electrolyte, and a current collector plate positioned at the bottom of the battery case, wherein the electrode group is formed by winding a positive electrode and a negative electrode with the interposition of a separator, the positive electrode comprises a belt-shaped positive electrode core and a positive electrode material mixture carried on the positive electrode core, the negative electrode comprises a belt-shaped negative electrode core and a negative electrode material mixture carried on the negative electrode core, at least one of the positive electrode and the negative electrode has an end portion parallel to the lengthwise direction thereof exposing the core, the end portion positioned at an end face of the electrode group is directly connected to the current collector plate, and at least part of the current collector plate is exposed outside at the bottom of the battery case.

For example, the present invention relates to a secondary battery comprising an electrode group, an electrolyte, a battery case for accommodating therein the electrode group and the electrolyte, and a current collector plate positioned at the bottom of the battery case, wherein the electrode group is formed by winding a positive electrode and a negative electrode with the interposition of a separator, the positive electrode comprises a belt-shaped positive electrode core and a positive electrode material mixture carried on the positive electrode core, the negative electrode comprises a belt-shaped negative electrode core and a negative electrode material mixture carried on the negative electrode core, the positive electrode has an end portion A parallel to the lengthwise direction thereof exposing the positive electrode core, the negative electrode has an end portion B parallel to the lengthwise direction thereof exposing the negative electrode core, the end portions A and B are positioned at one and the other end faces of the electrode group, respectively, the end portion A or B is directly connected to the current collector plate, and at least part of the current collector plate is exposed outside at the bottom of the battery case.

According to a preferred embodiment of the present invention, the current collector plate serves as the bottom of the battery case. In this case, it is preferable that the battery case comprises a cylindrical part and one of the openings of the cylindrical part is closed by the current collector plate. Further, an end of the cylindrical part around the opening is welded to the periphery of the current collector plate.

According to another preferred embodiment of the present invention, the battery case comprises a cylindrical part with a bottom, which has a through hole in the bottom. The current collector plate is provided with a protrusion to be fitted in the through hole and the protrusion is welded to the edge around the through hole.

In the present invention, it is preferable that the current collector plate has a thickness of 0.1 mm or more and 0.7 mm or less.

If the current collector plate is connected to the negative electrode, the current collector plate is preferably made of a nickel plate or a nickel-plated metal plate.

If the current collector plate is connected to the positive electrode, the current collector plate is preferably made of an aluminum plate, a nickel-chromium steel plate or an alloy plate mainly composed of aluminum.

In the present invention, the electrolyte preferably comprises a nonaqueous solvent and a solute dissolved in the nonaqueous solvent.

The present invention can be applied, for example, to well-known secondary batteries such as a nickel-cadmium storage battery, a nickel-metal hydride storage battery and a lithium ion secondary battery.

According to the present invention, a current collecting structure similar to that of a high-powered nickel-metal hydride battery is realized even in a battery having little hollow in the winding core of the electrode group. Accordingly, the present invention is particularly effective in a lithium ion secondary battery which has a small winding core due to small thickness of the electrodes and is highly demanded to be manufactured in a prismatic form.

BEST MODE FOR CARRYING OUT THE INVENTION

Embodiment 1

A battery according to the present invention comprises an electrode group, an electrolyte, a battery case for accommodating therein the electrode group and the electrolyte, and a current collector plate serving as the bottom of the battery case.

Such a battery is obtained by inserting the electrode group provided with the current collector plate serving as the battery case into a bottomless cylindrical part of the battery case. It is preferable that an opening of the cylindrical case corresponding to the bottom of the battery case is completely closed by the current collector plate. Further, it is preferable to weld the edge of the cylindrical part enclosing the opening to the periphery of the current collector plate.

The electrode group is formed by winding a positive electrode and a negative electrode with the interposition of a separator. The positive electrode comprises a belt-shaped positive electrode core and a positive electrode material mixture carried on the positive electrode core, while the negative electrode comprises a belt-shaped negative electrode core and a negative electrode material mixture carried on the negative electrode core.

At least one of the positive and negative electrodes has an end portion parallel to the lengthwise direction thereof exposing the core.

Such an electrode is obtained by applying the electrode material mixture to a portion of the belt-shaped core except one or both of the end portions along the lengthwise direction thereof. The end portion parallel to the lengthwise direction thereof exposing the core is positioned at an end face of the electrode group.

The end portion parallel to the lengthwise direction exposing the core is preferably protruded from the electrode group. Further, the end portion exposing the core is preferably welded to the current collector plate.

It may be possible to form the end portion parallel to the lengthwise direction exposing the core on either one of the positive and negative electrodes. However, it is preferable that both of the positive and negative electrodes have the end portion parallel to the lengthwise direction exposing the core, respectively.

In this case, the end portion of the positive electrode exposing the core and the end portion of the negative electrode exposing the core are positioned at one and the other end faces of the electrode group, respectively. Further, one of the end portions exposing the electrode core is welded to the current collector plate serving as the bottom of the battery case, while the other end portion exposing the electrode core is welded to another current collector plate.

According to this embodiment, the volume of the current collector plate in space inside the battery is reduced. Therefore, the height of the electrode group is able to be increased and hence the capacity is increased.

Further, according to this embodiment, the step of bonding the current collector plate and the bottom of the battery case is eliminated and the resistance is reduced as compared with a battery that collects electric current via a lead. By reducing the internal resistance in this manner, polarization during charge/discharge is inhibited, and hence improvement in battery characteristics, such as charge/discharge under high load, is expected. Moreover, since Joule heat generated during charge/discharge at high current is reduced, it is expected that increase in battery temperature is inhibited. Therefore, the present embodiment is effective in improving the battery capacity and the battery characteristics.

In this embodiment, the thickness of the current collector plate is preferably 0.1 mm or more and 0.7 mm or less in view of ensuring strength of the bottom of the battery and weldability.

If the current collector plate serving as the bottom of the battery case is connected to the negative electrode, the current collector plate needs to be made of a material that does not react with the electrolyte or the like at a potential of the negative electrode. For example, a nickel plate or a nickel-plated metal plate is preferably used.

If the current collector plate serving as the bottom of the battery case is connected to the positive electrode, the current collector plate needs to be made of a material that does not react with the electrolyte or the like at a potential of the positive electrode. For example, an aluminum plate, a nickel-chromium steel plate or an alloy plate mainly composed of aluminum is preferably used.

Embodiment 2

A battery according to this embodiment comprises an electrode group, an electrolyte, a battery case including a cylindrical part with a bottom and, a current collector plate positioned at the bottom of the battery case. The cylindrical part with the bottom has a through hole in the bottom and the current collector plate has a protrusion to be fitted in the through hole. The protrusion is preferably welded to the edge around the through hole to hermetically block the through hole.

In such a battery, welding of the protrusion of the current collector plate and the edge around the through hole is able to be carried out from outside the battery case. Therefore, the welding state can be visually checked directly. This makes possible to realize a current collecting structure in which the current collector plate is surely welded to the bottom of the battery case without use of the welding rod.

In a secondary battery according to this embodiment, the same electrode group as that of Embodiment 1 may be used. That is, the electrode group is formed by winding a positive electrode and a negative electrode with the interposition of a separator.

The positive electrode comprises a belt-shaped positive electrode core and a positive electrode material mixture carried on the positive electrode core, while the negative electrode comprises a belt-shaped negative electrode core and a negative electrode material mixture carried on the negative electrode core.

At least one of the positive and negative electrodes has an end portion parallel to the lengthwise direction thereof exposing the core. The end portion positioned at the end face of the electrode group is directly connected to the current collector plate.

The shape and size of the through hole perforated in the bottom of the battery case are not particularly limited. The shape and size of the protrusion formed in the current collector plate can be designed depending on the shape and size of the through hole. However, it is preferable that the protrusion is in the form that easily fills the through hole formed in the bottom of the battery case. For example, the protrusion is preferably in such a shape that the width increases from a distal end to a proximal part while maintaining the cross sections geometrically similar. The position of the through hole in the bottom of the battery case is not particularly limited.

For welding the protrusion of the current collector plate and the edge around the through hole, a conventionally known method may be adopted without any particular limitation. However, for example, seam welding using a laser is preferable in view of workability.

Hereinafter, the present invention is specifically described by way of examples.

EXAMPLE 1

In this example, was fabricated a cylindrical battery 1 in which a current collector plate serving as the bottom of the battery case was connected to a negative electrode. The battery was in the 18650 size (18 mm in diameter, 65 mm in battery height) and had a nominal capacity of 1000 mAh. Electric current from a positive electrode was collected via a lead. Hereinafter, explanation is given with reference to FIGS. 1–4.

(i) Manufacture of positive electrode $LiCoO_2$ as a positive electrode active material, acetylene black as a conductive agent and polyvinylidene fluoride as a binder were mixed in the ratio of 100:3:4 by weight to prepare a positive electrode material mixture. Polyvinylidene fluoride as the binder was used in a dissolved state in N-methyl-2-pyrrolidone to obtain the positive electrode material mixture in paste form. The above-described mixing ratio was established in a solid state.

Figure 1:
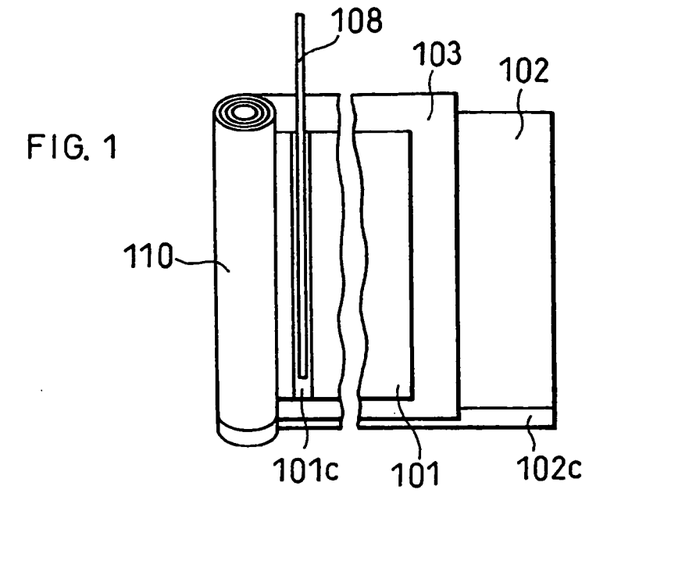
FIG. 1 is a diagram showing the structure of an electrode group of a battery according to an embodiment of the present invention.
Figure 2:
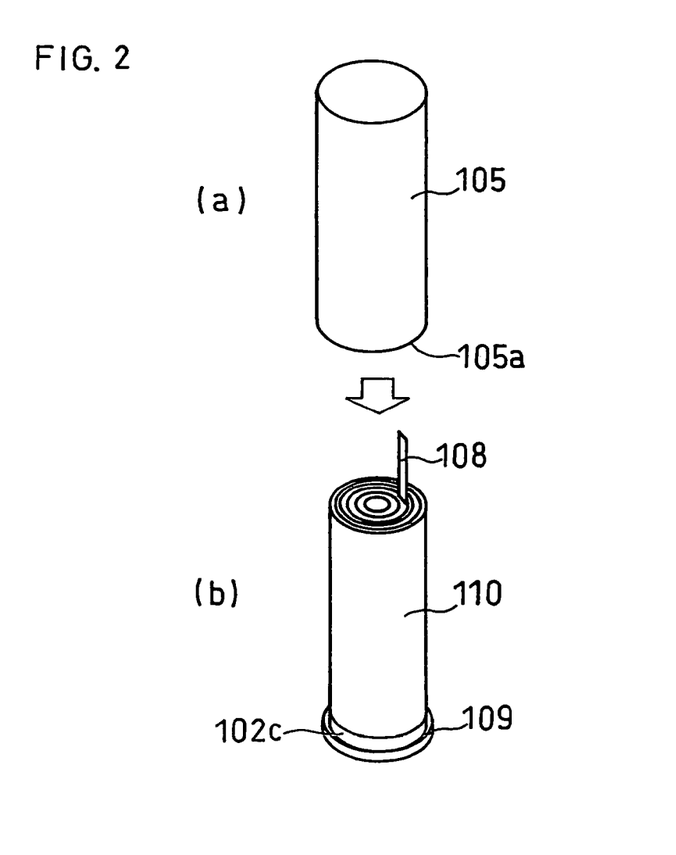
FIG. 2 is a diagram showing a step of accommodating the electrode group of the battery according to the embodiment of the present invention into a cylindrical part of a battery case.
Figure 3:
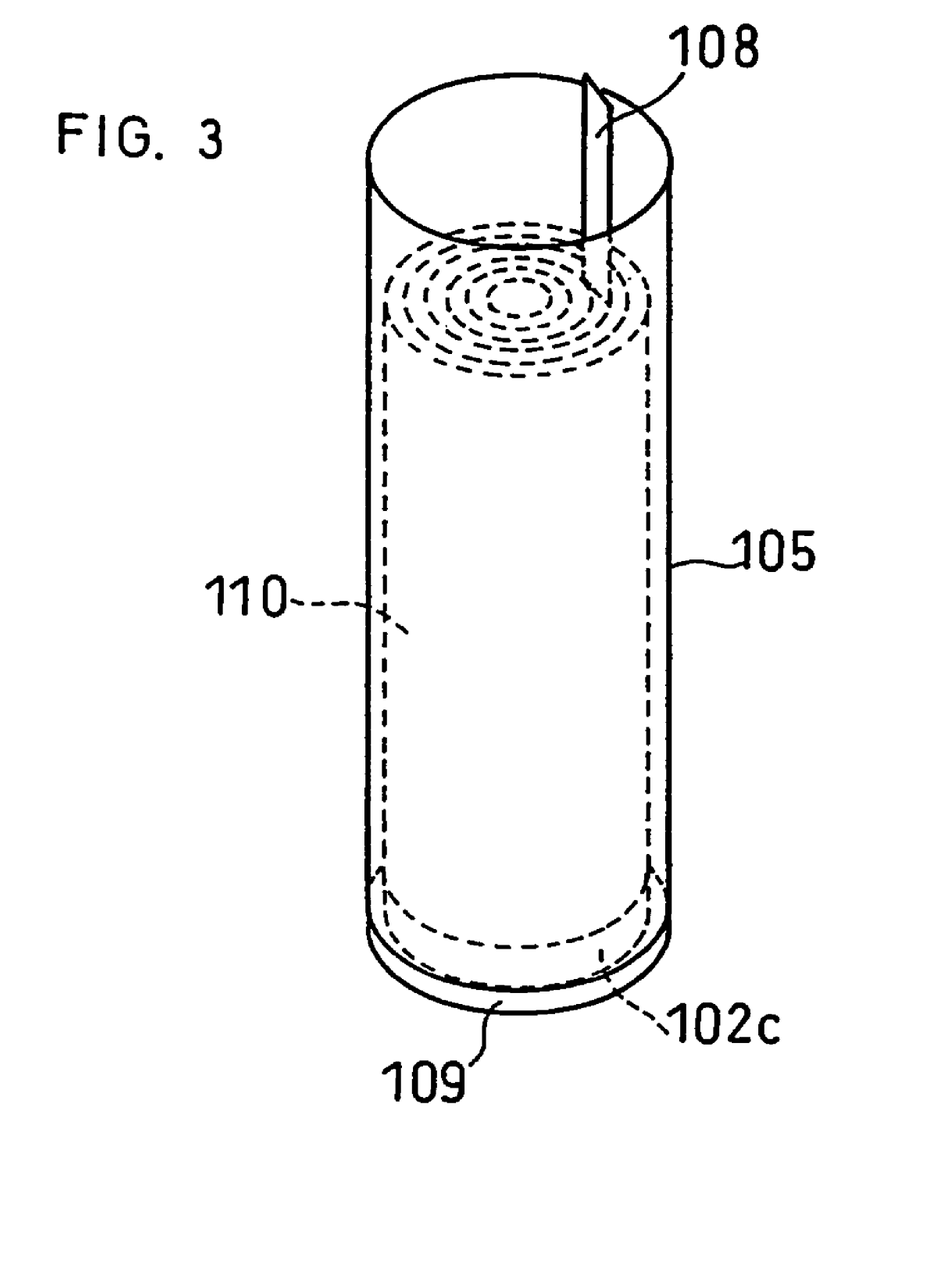
FIG. 3 is a diagram showing the internal structure of the electrode group of the battery according to the embodiment of the present invention accommodated in the cylindrical part of the battery case.

The positive electrode material mixture was applied to both surfaces of a belt-shaped positive electrode core 101b made of an aluminum foil of 20 μm thick to form positive electrode material mixture layers 101a. At that time, on one of the surfaces of the aluminum foil, an exposed part 101c uncoated with the positive electrode material mixture was provided. A lead 108 was attached to the exposed part 101c of the core.

The positive electrode material mixture layers 101a on the both surfaces were the same in thickness and the sum of the thicknesses of the positive electrode material mixture layers after drying was 170 μm. Accordingly, the positive electrode 101 had a thickness of 190 μm after drying. Then, the positive electrode 101 was pressed until its thickness was reduced to 100 μm using a roller of 300 mm in diameter.

(ii) Manufacture of negative electrode

Artificial graphite, styrene-butadiene rubber (SBR) as a binder and carboxymethyl cellulose as a thickener were mixed in the ratio of 100:3:1 by weight to prepare a negative electrode material mixture. Styrene-butadiene rubber as the binder was used in a dispersed state in water and carboxymethyl cellulose was used in a dissolved state in water to obtain the negative electrode material mixture in paste form. The above-described mixing ratio was established in a solid state.

The negative electrode material mixture was applied to both surfaces of a belt-shaped negative electrode core 102b made of a copper foil of 14 μm thick to form negative electrode material mixture layers 102a. At that time, in an end portion parallel to the lengthwise direction of the copper foil, an exposed part 102c of the core of 4 mm in width, both surfaces of which were not coated with the negative electrode material mixture, was provided.

The negative electrode material mixture layers 102a on the both surfaces were the same in thickness. After drying the negative electrode material mixture layers, the negative electrode 102 was pressed until its thickness was reduced to 117 μm using a roller of 300 mm in diameter.

(iii) Manufacture of electrolyte

To prepare an electrolyte, lithium hexafluorophosphate $(LiPF_6)$ as a solute was dissolved at a concentration of 1 $mol/dm^3$ in a mixture solvent of ethylene carbonate (EC) and diethyl carbonate (DEC) in the ratio of 1:1 by volume.

(iv) Manufacture of electrode group

As shown in FIG. 1, the positive electrode 101 and the negative electrode 102 were wound in a spiral fashion with the interposition of a separator 103 made of a fine porous polyethylene film to form an electrode group 110. At that time, the lead 108 connected to the exposed part 101c of the core of the positive electrode and the exposed part 102c of the negative electrode core 102b were protruded from one and the other end faces of the electrode group, respectively. The exposed part 102c of the negative electrode core 102b was protruded by 2 mm in length. Then, the protruded exposed part 102c was bent to form a bent portion 112 of the negative electrode. The outermost turn of the electrode group 110 was wrapped with the separator 103.

(v) Welding of current collector plate

As shown in FIG. 2(b), a disc-shaped (18 mm in diameter) nickel-made current collector plate 109 of 0.3 mm thick for the negative electrode was pressed onto the bent portion 112 of the negative electrode of the electrode group 110. Then, a laser beam was applied to the surface of the current collector plate 109 in a radial pattern, from center to edge. Thereby, the bent portion 112 and the current collector plate 109 were laser-welded.

(vi) Assembly of battery

The electrode group 110 to which the current collector plate 109 was bonded was inserted into a nickel-plated iron-made cylindrical case 105 shown in FIG. 2(a), an inner surface of which was nickel-plated. The cylindrical case 105 had openings at both ends. One of the openings of the cylindrical case 105 was closed by the current collector plate 109, which were laser welded from the current collector plate 109 side to bond the periphery of the current collector plate 109 and an opening end 105a of the cylindrical case 105. In this way, the welding can be performed from the bottom (the current collector plate 109) side, or alternatively, it can be performed from the side surface (the side of the opening end of the cylindrical case 105). The thickness of the cylindrical case 105 was 0.15 mm.

Figure 4:
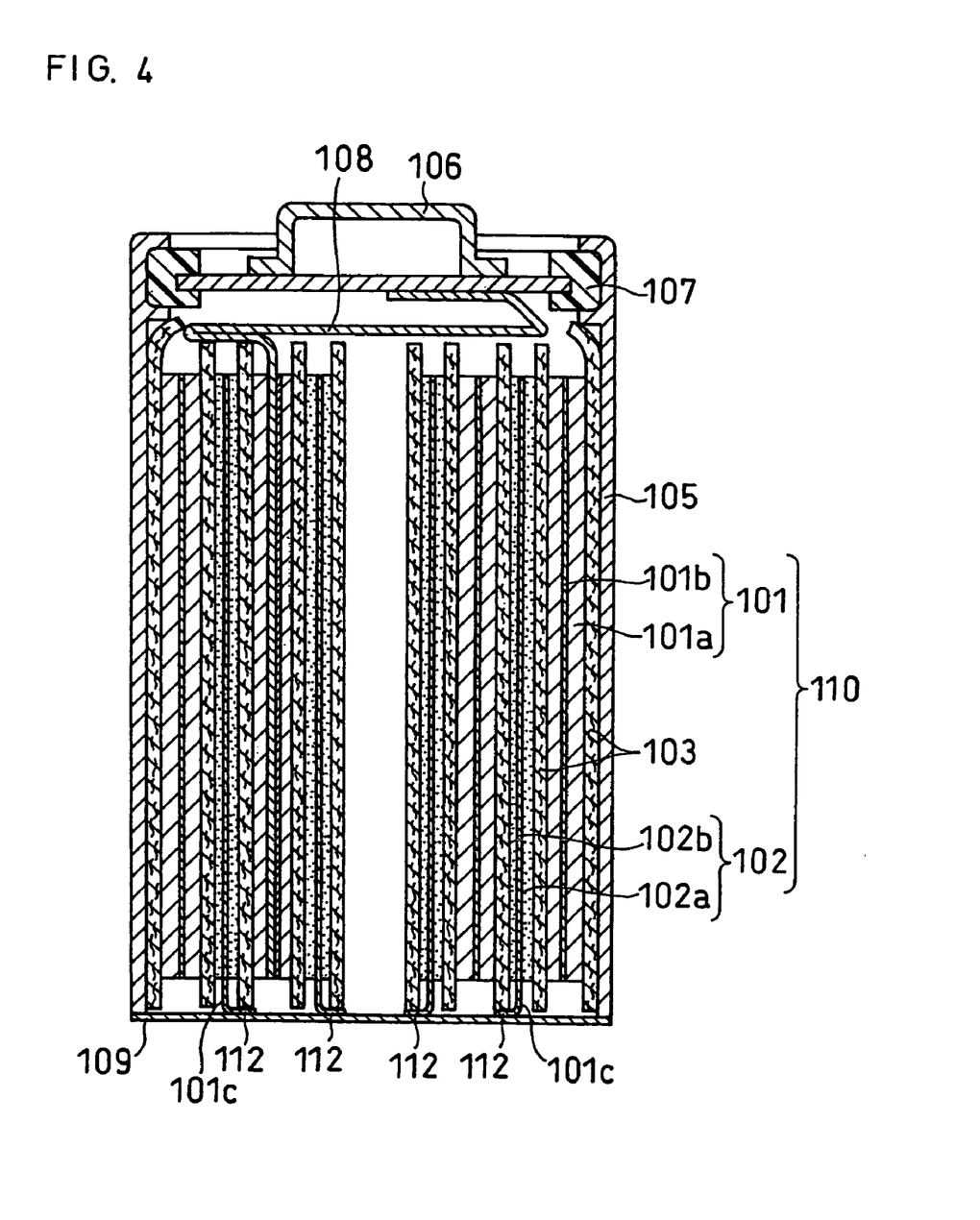
FIG. 4 is a vertical section of the battery according to the embodiment of the present invention.

Then, the lead 108 of the positive electrode and a lower surface of a battery lid 106 provided with an insulating packing 107 on the periphery thereof were bonded by laser welding. Then, an electrolyte was injected from the other opening of the cylindrical case 105 to impregnate the electrode group with the electrolyte under vacuum. Thereafter, the opening was sealed with the battery lid 106 and the opening end was crimped onto the insulating packing 107.

COMPARATIVE EXAMPLE 1

A comparative battery A was assembled in the same manner as Example 1 except that: the 4 mm wide exposed part was not formed on the end portion of the negative electrode parallel to the lengthwise direction thereof; a lead was connected also to the negative electrode in the same manner as that of the positive electrode; the positive and negative electrode leads were protruded from one and the other end faces of the electrode group, respectively; and the negative electrode lead was welded to the negative electrode current collector plate serving as the bottom of the battery case.

COMPARATIVE EXAMPLE 2

A comparative battery B was assembled in the same manner as Example 1 except that a case with a bottom was used instead of the cylindrical case having the openings on both ends; the electrode group bonded with the current collector plate via the bent portion of the negative electrode was accommodated in the case with the bottom; and the current collector plate and the bottom of the case were welded as in a conventional nickel-metal hydride storage battery.

COMPARATIVE EXAMPLE 3

A columnar electrode group having an approximately oval cross section was formed to fabricate a prismatic comparative battery C having the same current collecting structure as the comparative battery A. The size of a prismatic case was 6 mm in thickness, 34 mm in width and 50 mm in height.

COMPARATIVE EXAMPLE 4

A columnar electrode group having an approximately oval cross section was formed to fabricate a prismatic comparative battery D having the same current collecting structure as the comparative battery B. The size of a prismatic case was 6 mm in thickness, 34 mm in width and 50 mm in height.

[Evaluations of battery]

After discharging at a constant current of 200 mA, the battery 1 showed a capacity of 1020 mA. The internal resistance of the battery 1 measured by 1 kHz alternating current system was 15 mΩ. In a measurement performed in the same manner, the internal resistance of the comparative battery A was 24 mΩ and that of the comparative battery B was 13 mΩ.

During high load discharge at a discharge current of 10 A, the battery 1 was the most superior because the ratio of the capacity obtained by discharge at a constant current of 10 A to the capacity obtained by discharge at a constant current of 200 mA was large and the discharge behavior at 10 A was excellent. At that time, temperature increase in the battery 1 was lower than that in the comparative battery A by 9°.

EXAMPLE 2

A battery 2 was fabricated to have the same structure as the battery 1 of Example 1 except that: the 4 mm wide exposed part uncoated with the positive electrode material mixture was also provided on both surfaces of an end portion of the positive electrode parallel to the lengthwise direction thereof in the same manner as that of the negative electrode; the exposed parts of the positive and negative electrodes were protruded from one and the other end faces of the electrode group, respectively; both of the exposed parts protruded from the electrode group were bent to form bent portions of the positive and negative electrodes; a current collector plate for the negative electrode serving as the bottom of the battery case was bonded to the bent portion of the negative electrode; a current collector plate for the positive electrode, which was a size smaller than the current collector plate for the negative electrode, was bonded to the bent portion of the positive electrode; and the current collector plate for the positive electrode and a lower surface of the sealing plate were connected via a connector piece.

The internal resistance of the battery 2 was 11 mΩ, which was lower than that of the battery 1 of Example 1. Further, the battery 2 showed a property superior to the comparative batteries A and B under high load.

EXAMPLE 3

A battery 3 was fabricated to have the same structure as the battery 1 of Example 1 except the followings: an electrode group which was the same as that of the battery 2 of Example 2 was formed; the cylindrical case was replaced with an aluminum case and the current collector plate serving as the bottom of the battery case was replaced with an aluminum-made current collector plate; the orientation of the electrode group was reversed with that of the battery 2 to bond the bent portion of the positive electrode to the current collector plate serving as the bottom of the battery case; and a current collector plate for the negative electrode, which was a size smaller than the current collector plate for the positive electrode, was bonded to the bent portion of the negative electrode.

The internal resistance of the battery 3 was 10 mΩ. Further, the battery 3 also showed a property superior to the comparative batteries A and B under high load.

EXAMPLE 4

A battery 4 was fabricated to have the same structure as the battery 3 of Example 3 except that electric current from the negative electrode was collected via a lead. That is, the lead was connected to the negative electrode as that of the positive electrode of Example 1 without providing the exposed part on the end portion parallel to the lengthwise direction of the negative electrode.

The internal resistance of the battery 4 was 20 mΩ, which was lower than that of the comparative battery A. Further, the battery 4 showed a property superior to the comparative battery A under high load.

EXAMPLE 5

A columnar electrode group having an approximately oval cross section was formed to fabricate a prismatic battery 5 of the same current collecting structure as the battery 1 of Example 1 having the capacity of 480 mA. The size of a prismatic case was 6 mm in thickness, 34 mm in width and 50 mm in height.

The internal resistance of the battery 5 was 30 mΩ, which was smaller than 40 mΩ of the comparative battery C and 32 mΩ of the comparative battery D. Further, the battery 5 showed a property superior to the comparative batteries C and D under high load.

EXAMPLE 6

A columnar electrode group having an approximately oval cross section was formed to fabricate a prismatic battery 6 of the same current collecting structure as the battery 3 of Example 3 having the capacity of 480 mA. The size of a prismatic case was 6 mm in thickness, 34 mm in width and 50 mm in height.

The internal resistance of the battery 6 was 28 mΩ, which was smaller than that of the comparative battery C. Further, the battery 6 showed a property superior to the comparative battery C under high load.

EXAMPLE 7

Batteries were fabricated to have the same structure as that of Example 1 except that the thickness of the nickel-made current collector plate serving as the bottom of the battery case was changed to 0.1 mm, 0.7 mm or 1 mm.

Both batteries using the current collector plates of 0.1 mm thick and 0.7 mm thick showed the internal resistance of 15 mΩ. Although it was possible to fabricate the battery using the current collector plate of 0.1 mm thick, the bottom of the battery case was rather decreased in strength. Accordingly, the thickness of the current collector plate serving as the bottom of the battery case is preferably 0.1 mm or more. On the other hand, when the current collector plate of 1 mm thick was used, sufficient strength was not obtained for the weld of the current collector plate to the bent portion of the electrode. In view of the above, the thickness of the current collector plate is preferably 0.1 mm or more and 0.7 mm or less.

EXAMPLE 8

Analysis was carried out in the same manner as Example 7 except that the current collector plate for the negative electrode serving as the bottom of the battery case made of a nickel plate was replaced with a nickel-plated iron plate.

Still in that case, it was possible to fabricate batteries using the current collector plates of 0.1 mm thick and 0.7 mm thick. Both of the batteries showed the internal resistance of 16 mΩ.

EXAMPLE 9

Batteries were fabricated to have the same structure as that of Example 4 except that the current collector plate for the negative electrode serving as the bottom of the battery case was replaced with an aluminum-made current collector plate or an aluminum alloy containing 3% of magnesium and its thickness was changed to 0.1 mm, 0.7 mm or 1 mm.

Still in that case, it was possible to fabricate the batteries using the current collector plates of 0.1 mm thick and 0.7 mm thick. Both of the batteries showed the internal resistance of 33 mΩ.

In every battery obtained in Examples 1–9, the required charge/discharge cycle life was surely obtained and excellent shelf life was attained. Further, it was observed that the cylindrical batteries of Examples were improved in discharge capacity as compared with the comparative battery B and so were the prismatic batteries of Examples as compared with the comparative battery D.

EXAMPLE 10

In this example, a cylindrical battery 10 was fabricated, in which the current collector plate connected to the negative electrode had a protrusion, which was fitted in a through hole perforated in the bottom of the battery case. The battery was in the 18650 size (18 mm in diameter, 65 mm in battery height) and had nominal capacity of 1200 mAh. Hereinafter, explanation is given with reference to FIG. 5.

(i) Manufacture of positive electrode

Electrolytic manganese dioxide (EMD: $MnO_2$) and lithium carbonate ($Li_2CO_3$) were mixed in the ratio Li/Mn=1/2 (molar ratio). The mixture was sintered in an atmospheric air at 800% for 20 hours to synthesize a positive electrode active material $LiMn_2O_4$. The above-mentioned $LiMn_2O_4$, acetylene black as a conductive agent and polyvinylidene fluoride as a binder were mixed in the ratio of 100:3:5 by weight to prepare a positive electrode material mixture. Polyvinylidene fluoride as the binder was used in a dissolved state in N-methyl-2-pyrrolidone to obtain the positive electrode material mixture in paste form. The above-mentioned mixing ratio was established in a solid state.

Figure 5:
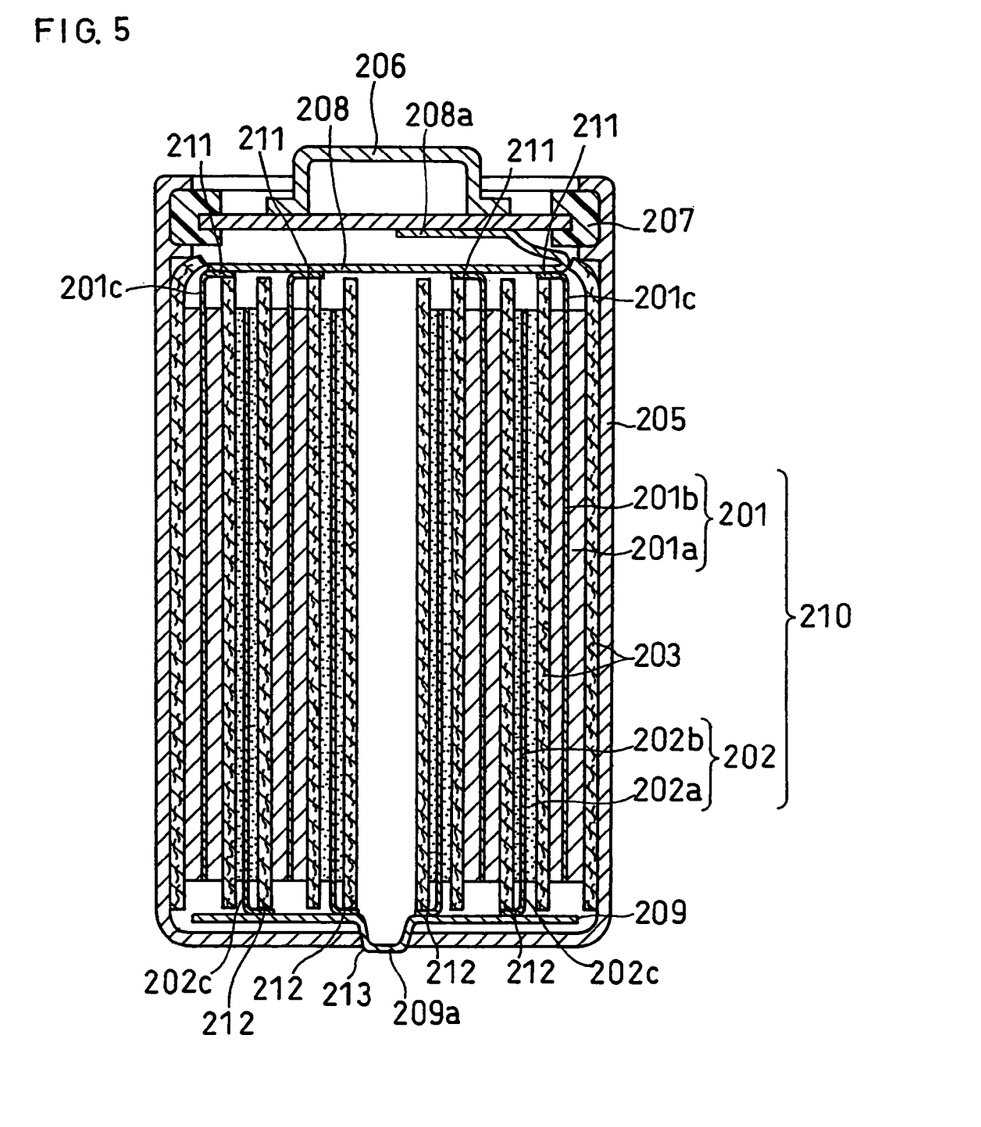
FIG. 5 is a vertical section of a battery according to another embodiment of the present invention.

The positive electrode material mixture was applied to both surfaces of a belt-shaped positive electrode core 201b made of an aluminum foil of 20 μm thick to form positive electrode material mixture layers 201a. At that time, in an end portion parallel to the lengthwise direction of the aluminum foil, an exposed part 201c of the core of 6.5 mm in width, both surfaces of which were not coated with the negative electrode material mixture, was provided.

The positive electrode material mixture layers 201a on the both surfaces were the same in thickness and the sum of the thicknesses of the positive electrode material mixture layers after drying was 280 μm. Accordingly, the positive electrode 201 had a thickness of 300 μm after drying. Then, the positive electrode 201 was pressed until its thickness was reduced to 200 μm using a roller of 300 mm in diameter.

(ii) Manufacture of negative electrode

Artificial graphite, styrene-butadiene rubber (SBR) as a binder and carboxymethyl cellulose as a thickener were mixed in the ratio of 100:3:1 by weight to prepare a negative electrode material mixture. Styrene-butadiene rubber as the binder was used in a dispersed state in water and carboxymethyl cellulose was used in a dissolved state in water to obtain the negative electrode material mixture in paste form. The above-described mixing ratio was established in a solid state.

The negative electrode material mixture was applied to both surfaces of a belt-shaped negative electrode core 202b made of a copper foil of 14 μm thick to form negative electrode material mixture layers 202a. At that time, in an end portion parallel to the lengthwise direction of the copper foil, an exposed part 202c of the core of 4 mm in width, both surfaces of which were not coated with the negative electrode material mixture, was provided.

The negative electrode material mixture layers 202a on the both surfaces were the same in thickness and the sum of the thicknesses of the negative electrode material mixture layers after drying was 300 μm. Accordingly, the negative electrode 202 had a thickness of 314 μm after drying. Then, the negative electrode 202 was pressed until its thickness was reduced to 170 μm using a roller of 300 mm in diameter.

(iii) Manufacture of electrolyte

To prepare an electrolyte, lithium hexafluorophosphate ($LiPF_6$) as a solute was dissolved at a concentration of 1 mol/dm$^3$ in a mixture solvent of ethylene carbonate (EC) and diethyl carbonate (DEC) in the ratio of 1:1 by volume.

(iv) Manufacture of electrode group

The positive electrode 201 and the negative electrode 202 were wound in a spiral fashion with the interposition of a separator 203 made of a fine porous polyethylene film to form an electrode group 210. At that time, the exposed part 201c of the positive electrode core 201b and the exposed part 202c of the negative electrode core 202b were protruded from one and the other end faces of the electrode group, respectively. Each of the exposed parts was protruded by 2 mm in length. Then, the protruded exposed parts were bent to form a bent portion 211 of the positive electrode and a bend portion 212 of the negative electrode. The outermost turn of the electrode group 210 was wrapped with the separator 203.

(v) Welding of current collector plate

A disc-shaped current collector plate 208 of 0.2 mm thick for the positive electrode was pressed onto the bent portion 211 of the positive electrode and a laser beam was applied to the surface of the current collector plate 208 in a radial pattern, from center to edge. Thereby, the bent portion 211 and the current collector plate 208 were laser-welded.

In a like manner, was welded to the bent portion 212 of the negative electrode a disc-shaped current collector plate 209 of 0.2 mm thick for the negative electrode having a protrusion 209a of 2.5 mm in distal diameter, 3.5 mm in proximal diameter and 1 mm in height provided at the center thereof. At that time, the surface of the current collector plate to be welded was so selected that the protrusion 209a was faced out.

(vi) Assembly of battery

The electrode group 210 to which the current collector plates 208 and 209 were bonded was accommodated in a battery case 205 and the protrusion 209a of the current collector plate 209 was fitted in a through hole 213 perforated in the bottom of the battery case 205. Then, the protrusion 209a and the edge around the through hole 213 were bonded by seam welding using a laser. The thickness of the battery case 205 was 0.5 mm and the diameter of the through hole 213 was 3 mm.

Then, a connector piece 208a drawn from the current collector plate 208 for the positive electrode and a battery lid 206 provided with an insulating packing 207 on the periphery thereof were bonded by laser welding. Further, an electrolyte was injected inside the battery case 205 to impregnate the electrode group with the electrolyte under vacuum. Thereafter, the opening of the battery case 205 was sealed with the battery lid 206 and the opening end was crimped onto the insulating packing 207.

[Evaluation of battery]

In the above-mentioned manner, 100 cylindrical batteries 10 were fabricated. An average value of the welding strength at that time was 18.5 kg/cm$^2$ and a standard deviation (value σ) was 0.9 kg/cm$^2$. These values are practically effective as compared with a conventional resistance welding process and the like.

In the case of welding the bottom of the battery case to the current collector plate in a cylindrical battery of the 18650 size using a conventional welding rod, the winding core needs to have a diameter of at least about 3.5 mm to carry out the welding with reliability. However, in the cylindrical battery 10 according to this example, the diameter of the winding core was reduced as small as about 0.5 mm. Thus, capacity improvement was achieved by about 4% on a volume basis.

INDUSTRIAL APPLICABILITY

According to the present invention, a current collecting structure similar to that of a high-powered nickel-metal hydride battery is easily realized.

Further, according to one of the preferred embodiments of the present invention, the volume of the current collector plate in space inside the battery is reduced. Therefore, the height of the electrode group is increased and hence the capacity is increased.

Further, according to one of the preferred embodiments of the present invention, the step of bonding the current collector plate and the bottom of the battery case is eliminated and the resistance is reduced as compared with a battery that collects electric current via a lead. By reducing the internal resistance of the battery in this manner, polarization during charge/discharge is inhibited, and hence improvement in battery characteristics, such as charge/discharge under high load, is expected. Moreover, since Joule heat generated during charge/discharge at a large current is reduced, inhibition of increase in battery temperature is also expected.

Further, according to one of the preferred embodiments of the present invention, the weld of the current collector plate to the bottom of the battery case is performed from the outside of the battery case. Therefore, a current collecting structure in which the current collector plate is surely welded to the bottom of the battery case is achieved.

The invention claimed is:

1. A secondary battery comprising an electrode group, an electrolyte, a battery case for accommodating therein said electrode group and said electrolyte, and a current collector plate positioned at the bottom of said battery case, wherein said electrode group is formed by winding a positive electrode and a negative electrode with the interposition of a separator, said positive electrode comprises a belt-shaped positive electrode core and a positive electrode material mixture carried on said positive electrode core, said negative electrode comprises a belt-shaped negative electrode core and a negative electrode material mixture carried on said negative electrode core, at least one of said positive electrode and said negative electrode has an end portion parallel to the lengthwise direction thereof exposing said core, said end portion positioned at an end face of said electrode group is directly connected to said current collector plate, said battery case comprises a cylindrical part with an inwardly extending bottom, said cylindrical part with the bottom has a through hole in the bottom, said current collector plate is provided with a protrusion to be fitted in said through hole, and said protrusion is welded to the edge around said through hole.

2. The secondary battery in accordance with claim 1, wherein said current collector plate has a thickness of 0.1 mm or more and 0.7 mm or less.

3. The secondary battery in accordance with claim 1, wherein said current collector plate is connected to said negative electrode and said current collector plate is made of a nickel plate or a nickel-plated metal plate.

4. The secondary battery in accordance with claim 1, wherein said current collector plate is connected to said positive electrode and said current collector plate is made of an aluminum plate, a nickel-chromium steel plate or an alloy plate mainly composed of aluminum.

5. The secondary battery in accordance with claim 1, wherein said electrolyte comprises a nonaqueous solvent and a solute dissolved in said nonaqueous solvent.

* * * * *